United States Patent
Aronson et al.

(10) Patent No.: US 8,806,461 B2
(45) Date of Patent: Aug. 12, 2014

(54) USING MEMORY USAGE TO PINPOINT SUB-OPTIMAL CODE FOR GAMING SYSTEMS

(75) Inventors: David Floyd Aronson, Woodinville, WA (US); Parham Mohadjer, Redmond, WA (US); Matthew Russell Kimball, Seattle, WA (US); Bruce Michael Dawson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1200 days.

(21) Appl. No.: 11/766,428

(22) Filed: Jun. 21, 2007

(65) Prior Publication Data
US 2008/0320458 A1   Dec. 25, 2008

(51) Int. Cl.
 *G06F 9/45* (2006.01)
(52) U.S. Cl.
 USPC ........... 717/151; 717/152; 717/153; 717/154; 717/155; 717/156
(58) Field of Classification Search
 None
 See application file for complete search history.

(56) References Cited

U.S. PATENT DOCUMENTS

| | | | |
|---|---|---|---|
| 5,179,680 A | 1/1993 | Colwell et al. | |
| 5,442,571 A | 8/1995 | Sites | |
| 5,829,029 A | 10/1998 | Shelly et al. | |
| 5,940,618 A | 8/1999 | Blandy et al. | |
| 6,002,875 A * | 12/1999 | Stolberg | 717/153 |
| 6,081,868 A | 6/2000 | Brooks | |
| 6,336,154 B1 * | 1/2002 | McCarthy et al. | 710/35 |
| 6,593,940 B1 * | 7/2003 | Petersen et al. | 714/38 |
| 6,865,665 B2 | 3/2005 | Jarvis | |
| 7,085,885 B2 | 8/2006 | Hardage, Jr. | |

FOREIGN PATENT DOCUMENTS

WO   WO 2007/031696 A1   3/2007

OTHER PUBLICATIONS

Krishnamurthy, et al. "Optimizing Parallel Programs with Explicit Synchronization", 1995, ACM, p. 196-204.*
Ozturk, et al. "Compiler-Directed Variable Latency Aware SPM Management to Cope With Timing Problems", 2007, IEEE, p. 1-12.*
Mowry, T.C. et al., "Predicting Data Cache Misses in Non-Mumeric Applications through Correlation Profiling", IEEE, 1997, 314-320, http://delivery.acm.org.
Marathe, J. et al., "Source-Code Correlated Cache Coherence Characterization of OpenMP Benchmarks", IEEE Transactions on Parallel and Distributed Systems, 2006, xx(y), 17 pages, http://moss.csc.ncsu.edu.
Marathe, J. et al., "METRIC: Memory Tracing via Dynamic Binary Rewriting to Identify Cache Inefficiencies", ACM Transactions on Programming Languages and Systems, Sep. 2006, 33 pages, http://moss.csc.ncsu.edu.
Mowry, T.C. et al., "Predicting Data Cache Misses in Non-Numeric Applications through Correlation Profiling", IEEE 1997, 314-320, http://delivery.acm.org.

* cited by examiner

*Primary Examiner* — Qamrun Nahar
(74) *Attorney, Agent, or Firm* — Micah Goldsmith; Andrew Sanders; Micky Minhas

(57) ABSTRACT

Systems and methods for using memory usage to pinpoint sub-optimal code for gaming systems are provided herein. Memory usage characteristics, such as latency, cache misses, load-hit-store, memory address misuse, and wasted cache bandwidth are presented, preferably in a graphical format, to provide the developer with information for optimizing source code. A trace analysis is performed on source code undergoing optimization. Relevant data is extracted from the trace analysis, sorted as necessary, and presented to the user. The user may be presented with multiple results sorting mechanisms as well as ways to change the presentation of the results.

18 Claims, 9 Drawing Sheets

USING MEMORY USAGE TO PINPOINT SUB-OPTIMAL CODE FOR GAMING SYSTEMS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2007, Microsoft Corp.

BACKGROUND

As developers develop applications that increasingly utilize console resources, the optimization of the use of those resources has rapidly become a critical component of the operability of the application. One of the resources used in a console is system memory. A typical console may have several types of memory available for use by the application, some of which include the L1 and L2 cache, and main system memory. A developer has several means in which to determine the effectiveness of the use of the console's memory. L1 and L2 cache are used by the CPU as a means to reduce the average time to access memory. L1 and L2 cache are small units of memory that stores copies of data of recently accessed or frequently used by the CPU. The time to access memory is termed latency, and as the number of memory calls made to L1 or L2 cache made by an application, in lieu of memory calls to main memory, the average latency decreases, thus essentially increasing the speed at which an application may cause the console to process data.

One of the goals of a developer is to optimize the use of L1 and L2 cache. When an application accesses a memory location, the CPU first checks to see if the memory location is in the cache. L1 cache is typically faster and smaller than L2 cache. The CPU will typically check L1 cache first, then L2 cache, then if the system is not configured with another interim type of memory, will then access main memory. If the CPU checks the L1 or L2 cache and find the memory address in the cache, called a cache hit, the CPU accesses the data residing in the cache and continues processing. If the CPU checks L1 cache and does not find the memory address, called a cache miss, the CPU will then check L2 cache. If the memory address is not found in the L2 cache, again termed a cache miss, the CPU will then access the memory address in main memory, write the data into the cache, and then access the data written into the cache. The hit rate is the percentage of times which the CPU finds memory addresses in the cache as opposed to the times in which the CPU does not find the memory address in the cache. The hit rate assists developers in determining the efficiency of the application in using cache.

As still further way to determine the effectiveness of the use of memory is to determine the latency of memory calls. As discussed above, the time it takes for a CPU to read data from a memory address is latency. As the average relative latency increases, the speed at which an application processes data decreases, thus slowing the application. Latency is also undesirable because while memory is being retrieved, the CPU is typically idle. Developers measure the latency of memory accesses to determine problem areas of their application, then attempt to amend the source code of the application to better utilize the memory. There may be several reasons why an application has suboptimal latency results. For example, an application that accesses a significant number of different memory addresses on a regular basis may cause the cache memory addresses to constantly change so that the next time the address is accessed, the address will no longer be in the cache. Another reason may be that the memory address is one of multiple memory addresses that need to be accessed by a particular function. If the memory addresses are not co-located within the same memory blocks of the main memory, the CPU may need to run through the memory addresses to find the next memory address to be located. Another reason may be that a high number of cache misses are occurring. Each cache miss has a latent amount of time used when a cache miss occurs. The reduction of cache misses also reduces the CPU idle time, as memory accesses will typically be located in the fast CPU caches of the L1 and L2 as opposed to main memory.

Tools available to the developer may pinpoint what the inefficiencies are in a particular source code for an application, e.g. latency, hit rates, wasted bandwidth for memory caches, and bad cache utilization. Although important measures of the efficiency of memory usage, knowing what problems are occurring for an application may not provide the necessary degree of granularity to fine tune an application. In current consoles, because of the limitations of the particular system and expected application speed desired by the consumer, it is increasingly important to fully utilize memory resources.

SUMMARY

In one exemplary and non-limiting example, a developer is provided with a memory usage interface that displays potential memory issues and the relevant portions of source code causing the potential memory issues. The developer may be presented with a sorted list of memory issues, from the issue of highest relevance to the issue of lowest relevance. The developer may change the interface to sort through memory issues in various ways to fine tune the source code. When a developer runs the interface, the interface calls an API to implement a trace of the memory calls made by the application. After either the entire application or a portion of the application is traced, the trace is recorded in a trace library. After the trace is stored in the trace library, an API is called to access certain trace recordings, analyze the trace according to search criteria, and to present the memory locations accessed and the relevant trace for that memory location as well as the portion of the source code that accessed the memory location to the developer, preferably in the form of a graphical user interface.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 illustrates an exemplary display showing memory issues;

FIG. 6 illustrates an exemplary display showing memory issues and the associated source code;

FIG. 7 illustrates an exemplary display showing information related to each unique memory address for the source code;

FIG. 8 illustrate an exemplary display showing layout and usage of system memory for a recorded time frame.

DETAILED DESCRIPTION

Overview

To optimize an application's memory calls, a developer may wish to analyze memory usage by an application. A developer will preferably be presented with a graphical user interface displaying various information regarding the usage of the memory. The graphical user interface is a graphical display of selected data from a trace analysis and recording when running the application being optimized through a trace analysis tool. To develop the data, a trace API will be called that runs the application source code through a trace analysis and recording application. The trace analysis will preferable record, among other information, memory calls made, the particular source code running when the memory call was made, any hits or misses from the memory call, and the type of memory accessed. Once the data is collected, it is sorted and presented in graphical form to the user for troubleshooting potential problem source code memory calls.

General Development of Trace Data

Figure 1:
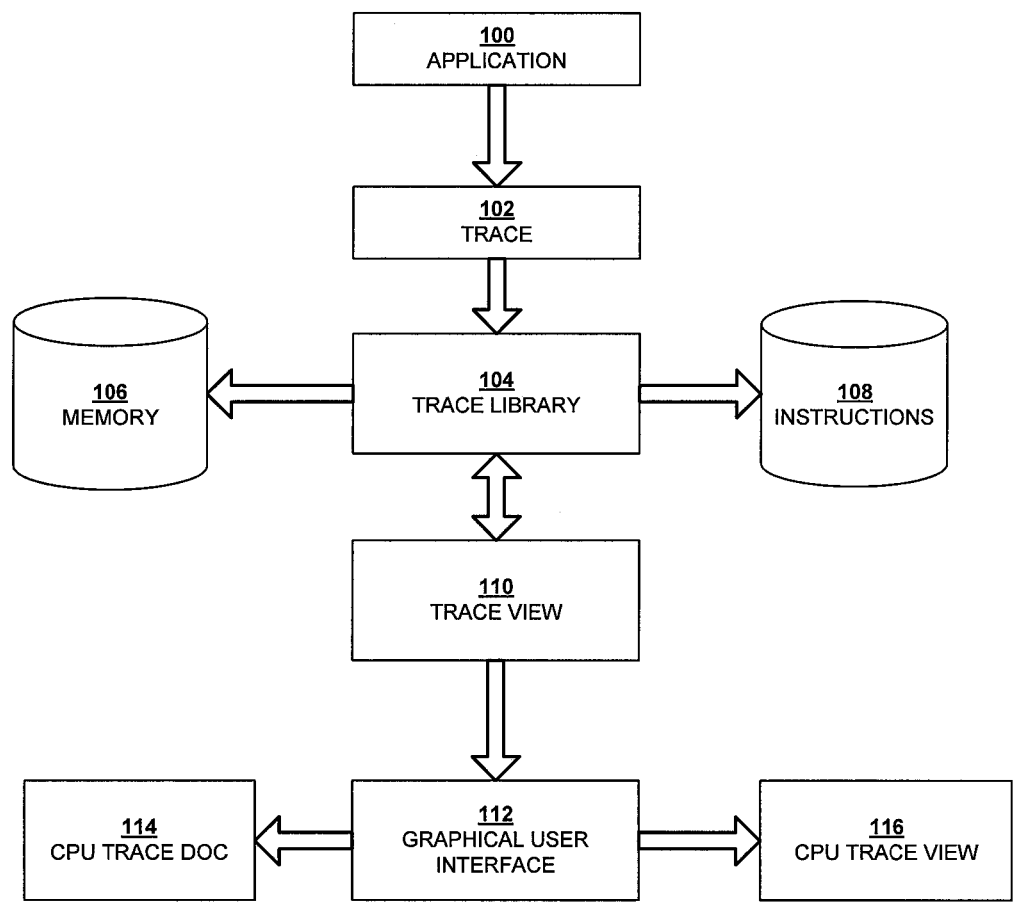
FIG. 1 illustrates an exemplary embodiment of a system for determining memory usage.

FIG. 1 illustrates an exemplary and non-limiting example of a system to develop data for use by the developer. There may be several ways in which an application may be run and the memory usage recorded. In this exemplary and non-limiting example, a developer writes source code for application 100. To optimize the source code memory usage, the developer runs the application using trace program 102, which is typically called through an API and records every instruction executed including the memory locations accessed. Trace program 102 then typically collects the data and stores the data in memory 106, which may include disk storage. Trace library 104 interprets data collected by trace program 102 to provide meaningful access to instructions 108 and memory 106, selecting certain desired pieces of the memory usage for presentation and stores the compiled data into memory 106. Trace view 110 is called to provide a viewable interface of the trace library contents.

Use of Trace Data

As discussed above, typical memory analysis methods provide the user with what memory issues may be occurring during the running of the application being analyzed. The present subject matter is directed towards providing a graphical user interface that gives the user not only what memory issues may be occurring, but also, among others, the portion or portions of source code in which the issues are occurring. Additionally, to further assist the developer, the memory addresses affected by the issues may also be presented.

In FIG. 1, graphical user interface is presented to the developer to graphically illustrate possible memory issues based on data from trace library 104. CPU trace doc 114 provides specific reports about possible memory issues and CPU trace view provides the graphical representation of the data as well as the contextual links between memory locations and source code.

Figure 2:
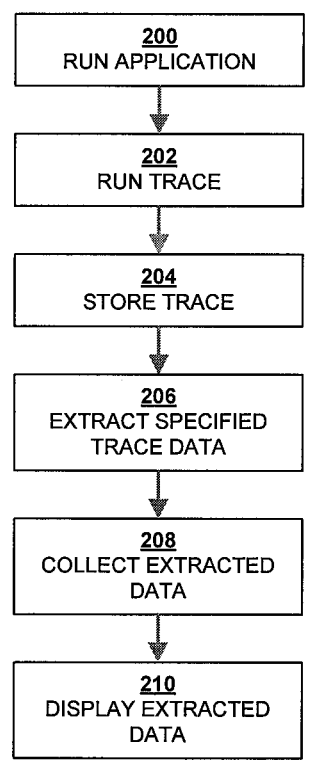
FIG. 2 is an exemplary data flow for determining memory usage.

FIG. 2 is an exemplary and non-limiting example of a way to collect trace data for further analysis and optimization by the developer based on the results. At step 200, the developer will run the application in conjunction with the trace analysis at step 202. The trace analysis will be stored at step 204 and the data extracted at step 206. The extracted data will be collected at step 208 and displayed at step 210.

Memory Usage

Figure 3:
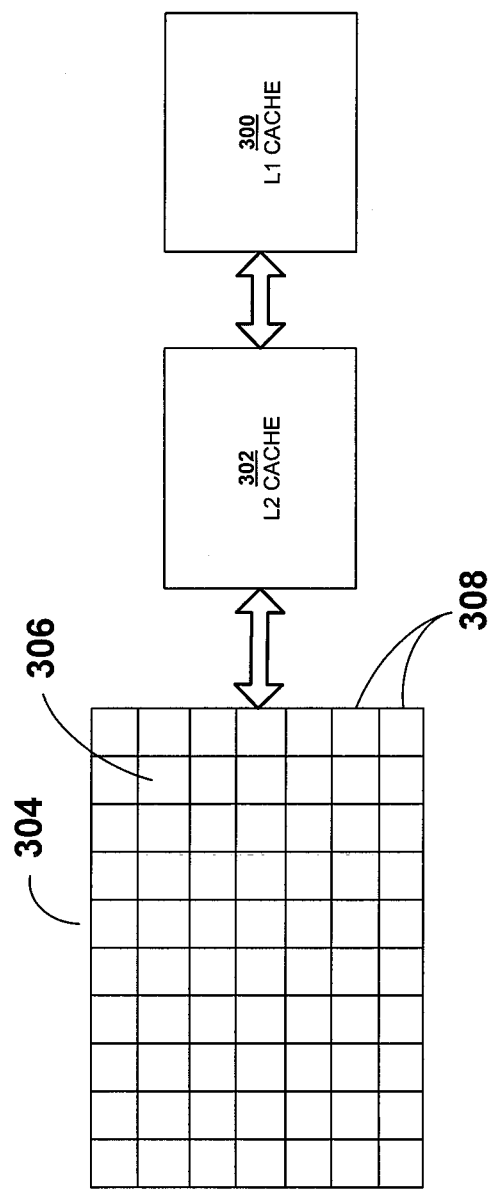
FIG. 3 illustrates an exemplary memory configuration.

As discussed above, there may be several types of memory available to for use by the application. FIG. 3 illustrates an exemplary and non-limiting example of multi-level cache and system memory that may be found on a typical console. The fastest memory, i.e. the memory theoretically with the smallest latency, is L1 cache 300. L1 cache 300 is typically constructed from fast accessing materials and is typically located within the CPU core or co-located within the same area on an integrated circuit. The purpose is to have the L1 cache 300 as close to the CPU as possible to reduce access delays. L2 cache 302 is typically co-located with L1 cache 300, but typically holds a larger amount of cached data. L2 cache 302 latency is typically longer than L1 cache 300 latency, therefore an application will typically determine if the memory address needed is in L1 cache 300 first, then if there is a miss, the application will then check L2 cache 302, thus resulting in a longer latency for memory access.

Memory 304 is an exemplary and non-limiting example of a system memory. Although shown as a single unit of memory in FIG. 3, memory 304 may consist of several types of memory, including flash memory as well as hard drives. Memory 304 is typically represented in page table form due to the possible disparate types of memory available and the use of virtual addressing. As discussed above, the memory may be volatile memory, or primary memory such as RAM, which is relatively fast but is not maintained when the system is powered down, or non-volatile, or secondary memory such as a hard disk, that perpetuates through a power down cycle but is typically slower. Memory 304 is representative of a memory page table, with each block, such as block 306, representing a page of memory. The size of the page may vary from system to system or from block to block, depending upon the system configuration.

The page table may also be comprised of different pages used for different resources within the system. A typical console will have two processing units, a CPU and a GPU. The GPU typically handles, among other functions, memory calls relating to graphics processing while the CPU handles the remaining memory calls, among other functions. Memory may be allocated for use specifically by the GPU, as the memory pages may be close in order for quicker access or the type of memory may allow quicker graphics processing. It is typically preferable that the memory used by a GPU, represented by rows 308 in FIG. 3, not be used by the CPU. Along with other issues that may arise from tracing memory accesses, the use of memory set aside for the GPU used by the CPU may be another issue.

Analyzing the Trace Data

Once the trace data is collected and the relevant data is extracted from the trace library, the developer may begin determining what memory issues may be occurring and what portions of the source code are causing those issues. There may be several memory issues, including cache misses per cache line and wasted bandwidth for both the L1 and L2 cache. The more effectively cache is used in an application, typically, the more efficiently an application will run. Another indication of potential inefficiency of memory usage may be instances of a load-hit-store. This related memory issue occurs due to the fact that although an application may request a store operation, the store operation may not occur at the time the store operation is requested.

Figure 4:
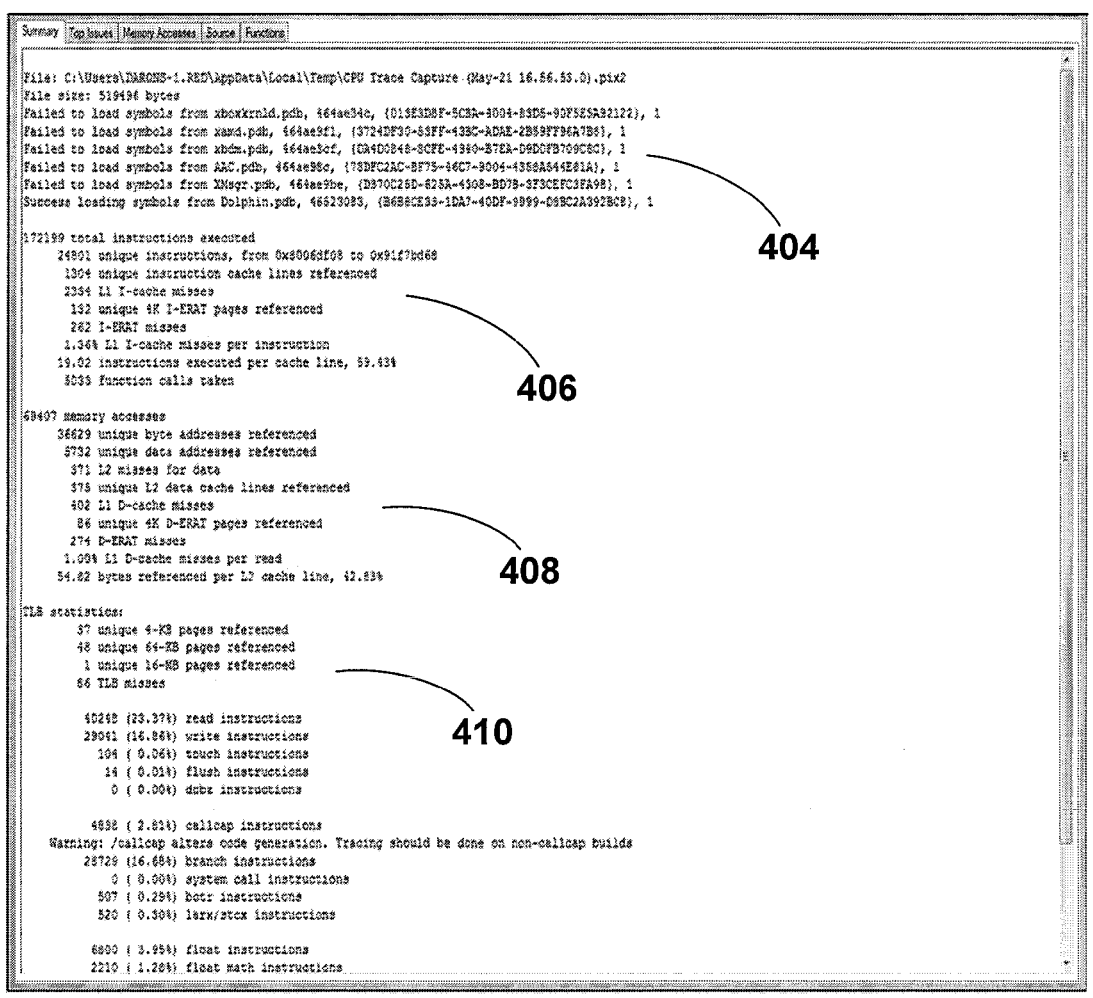
FIG. 4 illustrates an exemplary memory trace summary display.

FIG. 4 is illustrative of a display to assist the developer in not only realizing the memory issues that may be present in the source code, including the issues discussed above, but the particular source code portions that may be causing the issues as well as the particular memory locations for each issue. By providing a graphical display of the issues, the source code, as well as the particular memory addresses, the developer may optimize the source code using a higher level of granularity than provided with a typical trace analysis. Display 400 may have several different screens, selected by tabs 402, provided to the developer to assist the developer in narrowing the possible source code problems.

In FIG. 4, a summary of the trace analysis data as well as other information is displayed. In section 404 of display 400, the file processed through the trace analysis as well as some issues that may have occurred during the trace analysis is provided to the developer. The developer may need to re-run the trace analysis if the wrong file was processed or certain issues with the trace analysis occur, such as missing entire blocks of vital source code.

Section 406 provides the developer with a summary of the source code analyzed as well the memory usage statistics from the point of view of the source code. For example, section 406 may provide, among other information, the total number of instructions executed, the number of L1 cache misses, the number of cache misses per instruction, and the number of instructions executed per cache line. From the point of view of the memory, section 408 provides the developer with information such as the number of unique memory addresses reference and the number of L2 misses. Display 400 in summary mode may also provide information relating to a translation lookaside buffer (TLB) to the developer in section 410.

Figure 5:
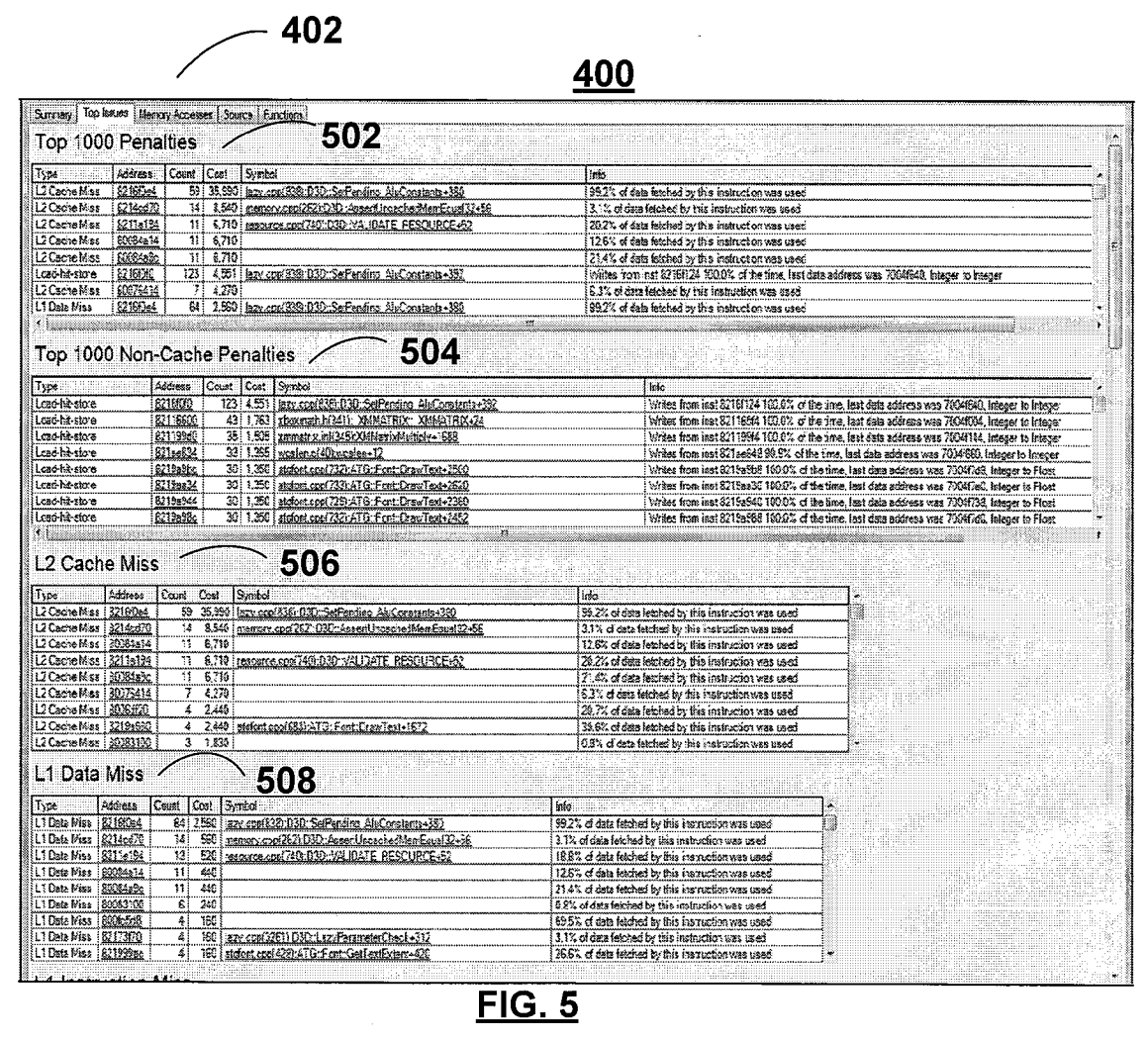

Another possible available screen selectable through tab 402 in display 400 may be a summary of the top issues determined for the executed source code. By analyzing the data collected through the trace analysis, a listing of memory issues, from high importance or cost to low importance or cost, may be provided. The importance or cost of the memory issue may be determined by, among others, current industry best practices, a developer's own experience in optimizing source code, or through default settings. FIG. 5 illustrates an exemplary and non-limiting example of display 400 showing the top issues as determined through criteria selected by the developer or through other means. The ranking may be provided to, among other reasons, assist the developer in determining which memory issues may need to be addressed first or which memory issues may have the largest increase in memory optimization if addressed.

Shown in FIG. 5 is an exemplary and non-limiting ranking of potential memory issues. Issue list 502 illustrates the top 1000 penalties, or potential memory issues. It may be preferable to have a compiled list of all types of memory issues as the first ranking to provide the context in which the memory issues may be occurring. For example, the developer may wish to see at a glance which memory issues are occurring most often, despite their potential cost or importance. Issue list 504 illustrates the top 100 non-cache penalties, issue list 506 illustrates the top L2 cache misses and issue list 508 illustrates the top L1 cache misses. The issue lists presented are not intended to limit the scope of the present subject matter, but rather, are illustrative of possible memory issues and their respective ranking.

In addition to the type of memory issue, it may be preferable to provide additional information to the developer to further narrow the scope of the search for sub-optimal code. Taking issue list 508, for example, the memory address for each memory issue in list 508 is provided, as well the number of times the issue occurred for that memory address and the relative cost of the memory issue. Additional information provided to the developer may be the exact CPU source code line that caused the issue. This allows the developer to determine what issues are occurring, the memory address in which the issues are occurring, the cost of each issue, and the source code causing the issue.

Figure 6:
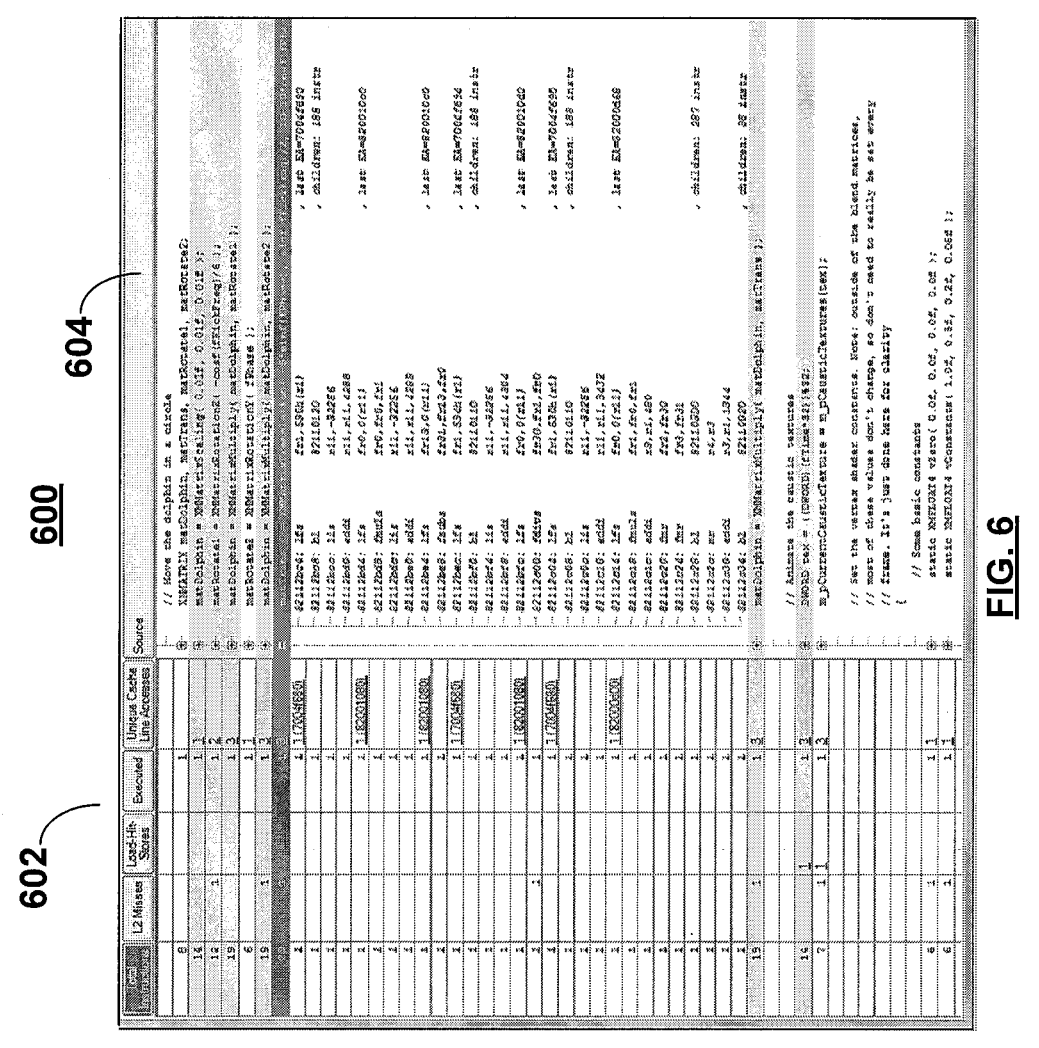

Because a single line of source code may cause several memory issues to occur, it may be preferable to determine at the source code level which source code lines are creating potential memory issues and the memory locations for those issues. FIG. 6 is an exemplary and non-limiting example of a display that provides source code level memory issue information. Section 604 of display 600 illustrates source code that may have caused potential memory issues. Section 602 of display 600 illustrates the potential memory issues caused by the related source code. For example, the highlighted portion of source code in section 604 has 29 total instructions and has created 1 L2 miss with three unique cache line accesses. The developer can sort through the various portions of the source code and find the exact line or lines that caused the one L2 miss.

Figure 7:
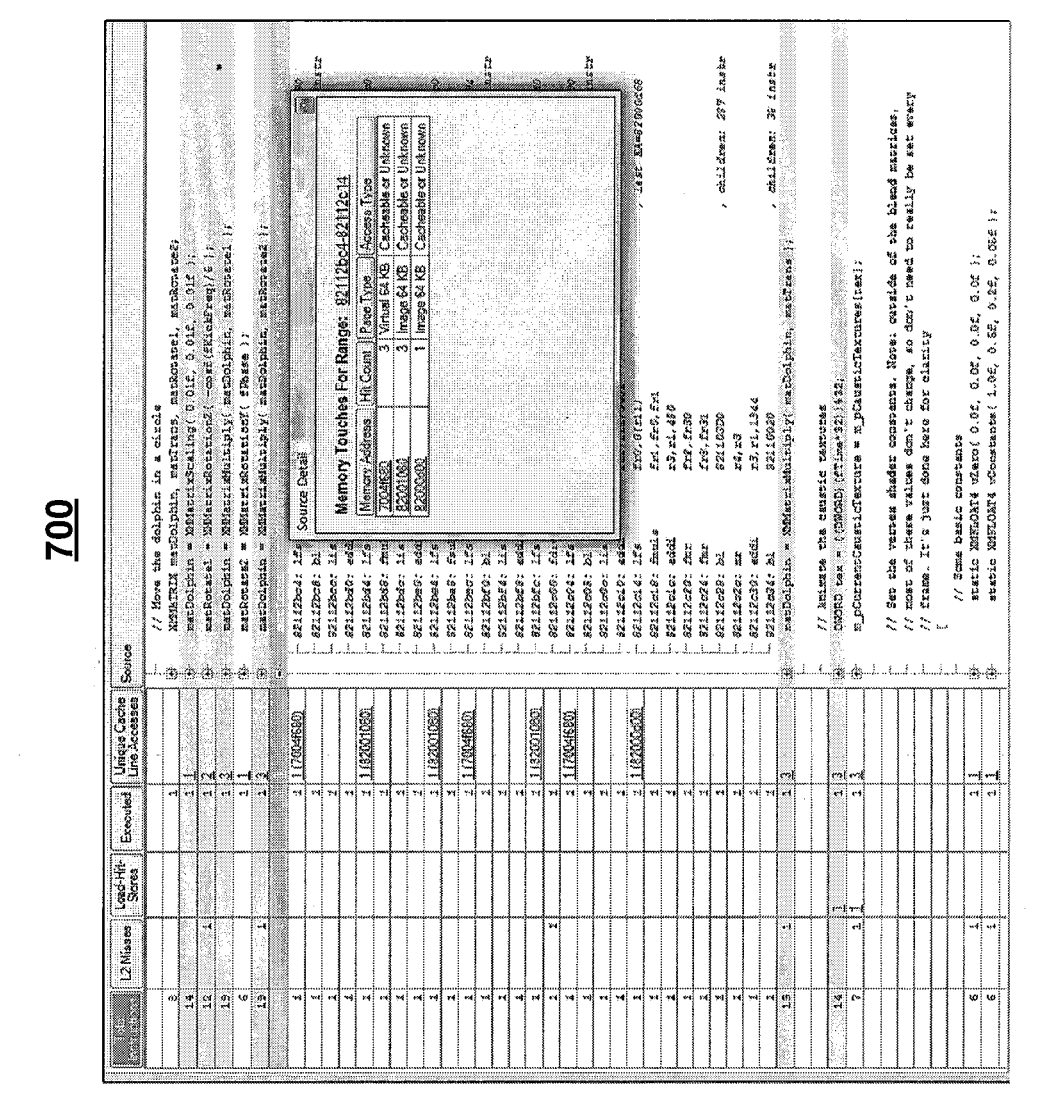

In an application that may have thousands of lines of source code, although the exact source code lines that may be causing memory issues may be important information, it may be difficult for the developer to know anything about that particular line of code. While the developer may be able to sort through the source code in another application, it may be preferable to provide additional source code information to the developer while the developer is looking at the issues. FIG. 7 is an exemplary and non-limiting example of a display providing additional source code information. FIG. 7 has display 700, which is an extension of display 600 of FIG. 6. If the developer clicks on the line of source code, display 700 is shown preferable in the same window as display 600. The developer may be provided with information such as the memory address affected, or touched, by the line or lines of source code, the hit count of the source code, the page type of the memory accessed, and the access type. This information is similar to the information provided in the display of FIG. 5, but instead of basing the display on memory, the display is based upon CPU source code.

Figure 8:
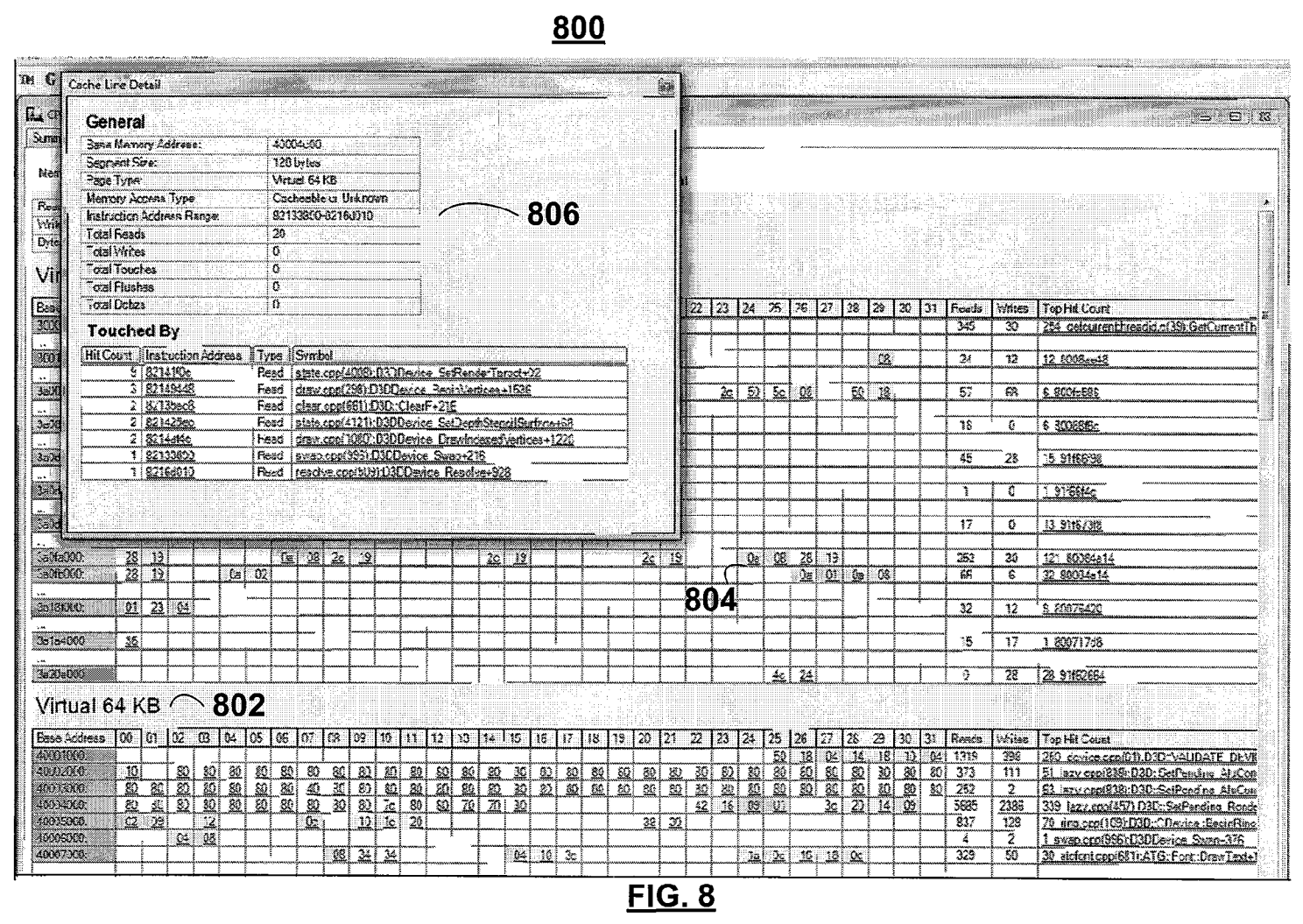

FIG. 8 is an exemplary and non-limiting example of a display providing detailed information of the cache line pages. FIG. 8 has display 800 showing details about the cache line. Display 800 has a portion of or all the memory pages in table format. For example, section 802 illustrates the memory using virtual 64 KB cache page size, where each table cell may be the size of L1 cache in some consoles. The particular pages may be highlighted or color coded to provide readily recognizable information regarding the particular cache line page. For example, a cache line that has a significant number of functions that are creating cache misses may be displayed in red, wherein a cache line that has a low number of potential memory issues may be displayed in white, as shown by illustration by cache line page 804. The developer, when selecting a particular cache line within a section, may be presented additional information regarding that particular cache line, illustrated in display 806. Information regarding that particular cache line may include the instruction address range for the functions that access that page, the particular functions that accessed the page, and the type of accesses made by each function.

Another benefit that may be found by using the display of FIG. 8 is to readily observe memory misuse. As mentioned earlier, system memory may be allocated between memory used by the CPU and memory used by the GPU. Display 806 shows details about the cache lines but may also show details regarding page types. If the CPU application is accessing memory addresses set aside for GPU use, a developer may readily observe the misuse if the memory address improperly used is indicated, preferably by a color-coding system.

Exemplary Computing Environment

Figure 9:
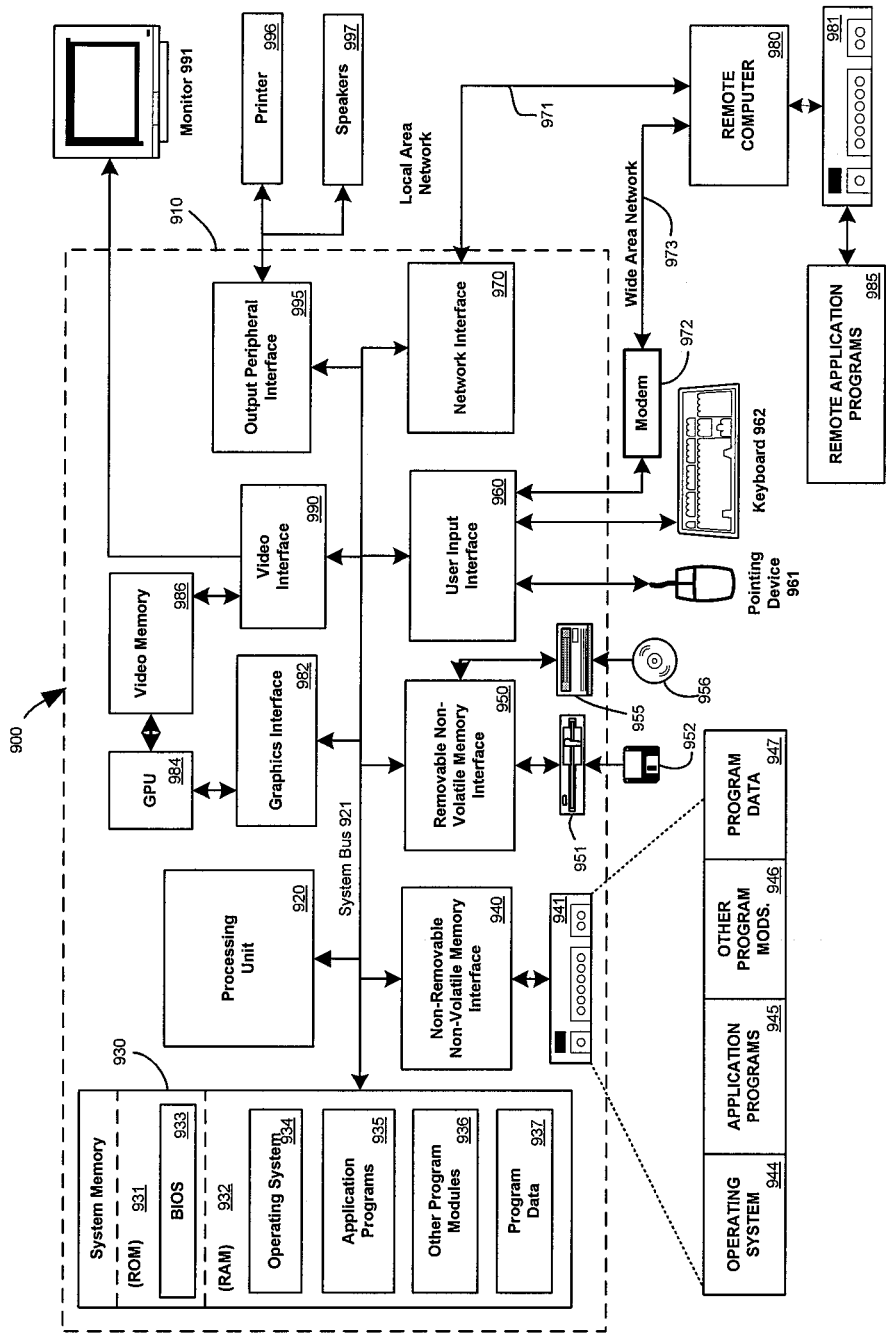
FIG. 9 shows an exemplary computing environment in which aspects of the example embodiments may be implemented.

FIG. 9 shows an exemplary computing environment in which aspects of the example embodiments may be implemented. Computing system environment 900 is only one example of a suitable computing environment and is not intended to suggest any limitation as to the scope of use or functionality of the described example embodiments. Neither should computing environment 900 be interpreted as having any dependency or requirement relating to any one or combination of components illustrated in exemplary computing environment 900.

The example embodiments are operational with numerous other general purpose or special purpose computing system environments or configurations. Examples of well known computing systems, environments, and/or configurations that may be suitable for use with the example embodiments include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The example embodiments may be described in the general context of computer-executable instructions, such as program modules, being executed by a computer. Generally, program modules include routines, programs, objects, components, data structures, etc. that perform particular tasks or implement particular abstract data types. The example embodiments also may be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing the example embodiments includes a general purpose computing device in the form of a computer 910. Components of computer 910 may include, but are not limited to, a processing unit 920, a system memory 930, and a system bus 921 that couples various system components including the system memory to processing unit 920. Processing unit 920 may represent multiple logical processing units such as those supported on a multi-threaded processor. System bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). System bus 921 may also be implemented as a point-to-point connection, switching fabric, or the like, among the communicating devices.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

System memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

Computer 910 may also include other removable/non-removable, volatile/nonvolatile computer storage media. By way of example only, FIG. 6 illustrates a hard disk drive 940 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956, such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 941 is typically connected to system bus 921 through a non-removable memory interface such as interface 940, and magnetic disk drive 951 and optical disk drive 955 are typically connected to system bus 921 by a removable memory interface, such as interface 950.

The drives and their associated computer storage media discussed above and illustrated in FIG. 9, provide storage of computer readable instructions, data structures, program modules and other data for computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to processing unit 920 through a user input interface 960 that is coupled to the system bus, but may be connected by other interface and bus structures, such as a parallel port, game port or a universal serial bus (USB). A monitor 991 or other type of display device is also connected to system bus 921 via an interface, such as a video interface 990. In addition to the monitor, computers may also include other peripheral output devices such as speakers 997 and printer 996, which may be connected through an output peripheral interface 995.

Computer 910 may operate in a networked environment using logical connections to one or more remote computers, such as a remote computer 980. Remote computer 980 may be a personal computer, a server, a router, a network PC, a peer device or other common network node, and typically includes many or all of the elements described above relative to computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, computer 910 is connected to LAN 971 through a network interface or adapter 970. When used in a WAN networking environment, computer 910 typically includes a modem 972 or other means for establishing communications over WAN 973, such as the Internet. Modem 972, which may be internal or external, may be connected to system bus 921 via user input interface 960, or other appropriate mechanism. In a networked environment, program modules depicted relative to computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

Computing environment 900 typically includes at least some form of computer readable media. Computer readable media can be any available media that can be accessed by computing environment 900. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing environment 900. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of optimizing source code, comprising:
performing a trace analysis on the source code to collect trace analysis data;
extracting memory usage information from the trace analysis data;
displaying a source code listing of the source code;
receiving an indication that a user has used the source code listing to select a portion of source code in the source code listing;
based on the portion of source code selected using the source code listing:
identifying a memory address associated with the selected portion of source code;
identifying a first portion of the extracted memory usage information associated with the selected portion of source code; and
displaying the memory address and the first portion of the extracted memory usage information associated with the selected portion of source code; and
determining, from the extracted memory usage information, a memory address misuse in connection with a portion of memory addresses comprising a first sub-portion of memory addresses allocated to a first processing unit and a second sub-portion of memory addresses allocated to a second processing unit, the first sub-portion of memory addresses comprising the identified memory address associated with the selected portion of source code, the memory address misuse comprising an access by the second processing unit of the memory address in the first sub-portion of memory addresses allocated to the first processing unit.

2. The method of claim 1, further comprising determining a plurality of memory issues from the extracted memory usage information, wherein the plurality of memory issues comprises the memory address misuse.

3. The method of claim 2, wherein the plurality of memory issues further comprises a cache miss, load-hit-store, and wasted cache bandwidth.

4. The method of claim 2, further comprising:
associating the selected portion of source code with a memory issue of the plurality of memory issues; and
associating the memory issue and the selected portion of source code with the memory address.

5. The method of claim 4, further comprising indicating the memory issue associated with the memory address through use of color coding.

6. The method of claim 2, further comprising ranking the plurality of memory issues according to importance and/or cost.

7. A computer-readable storage medium having stored thereon computer-executable instructions that, upon execution by one or more processors of a computing system, cause the computing system to perform acts comprising:
  performing a trace analysis on source code to collect trace analysis data;
  extracting memory usage information from the trace analysis data;
  displaying a source code listing of the source code;
  receiving an indication that a user has used the source code listing to select a portion of source code in the source code listing; and
  based on the portion of source code selected using the source code listing:
    identifying a memory address associated with the selected portion of source code;
    identifying a first portion of the extracted memory usage information associated with the selected portion of source code; and
    displaying the memory address and the first portion of the extracted memory usage information associated with the selected portion of source code; and
  determining, from the extracted memory usage information, a memory address misuse in connection with a portion of memory addresses comprising a first sub-portion of memory addresses allocated to a first processing unit and a second sub-portion of memory addresses allocated to a second processing unit, the first sub-portion of memory addresses comprising the identified memory address associated with the selected portion of source code, the memory address misuse comprising an access by the second processing unit of the memory address in the first sub-portion of memory addresses allocated to the first processing unit.

8. The computer-readable storage medium of claim 7, wherein the acts further comprise determining a plurality of memory issues from the extracted memory usage information, wherein the plurality of memory issues comprises the memory address misuse.

9. The computer-readable storage medium of claim 8, wherein the plurality of memory issues further comprises a cache miss, load-hit-store, and wasted cache bandwidth.

10. The computer-readable storage medium of claim 8, wherein the acts further comprise:
  associating the selected portion of source code with a memory issue of the plurality of memory issues; and
  associating the memory issue and the selected portion of source code with the memory address.

11. The computer-readable storage medium of claim 10, wherein the acts further comprise indicating the memory issue associated with the memory address through use of color coding.

12. The computer-readable storage medium of claim 8, wherein the acts further comprise ranking the plurality of memory issues according to importance and/or cost.

13. A computer system for optimizing source code, comprising:
  at least one processor;
  memory having stored therein processor executable instructions that, when executed by the at least one processor, cause the computer system to perform acts comprising:
    performing a trace analysis on the source code to collect trace analysis data;
    extracting memory usage information from the trace analysis data;
    displaying a source code listing of the source code;
    receiving an indication that a user has used the source code listing to select a portion of source code in the source code listing; and
    based on the portion of source code selected using the source code listing:
      identifying a memory address associated with the selected portion of source code;
      identifying a first portion of the extracted memory usage information associated with the selected portion of source code; and
    displaying the memory address and the first portion of the extracted memory usage information associated with the selected portion of source code; and
    determining, from the extracted memory usage information, a memory address misuse in connection with a portion of memory addresses comprising a first sub-portion of memory addresses allocated to a first processing unit and a second sub-portion of memory addresses allocated to a second processing unit, the first sub-portion of memory addresses comprising the identified memory address associated with the selected portion of source code, the memory address misuse comprising an access by the second processing unit of the memory address in the first sub-portion of memory addresses allocated to the first processing unit.

14. The computer system of claim 13 wherein the acts further comprise:
  determining a plurality of memory issues from the extracted memory usage information, wherein the plurality of memory issues comprises the memory address misuse.

15. The computer system of claim 14, wherein the plurality of memory issues further comprises a cache miss, load-hit-store, and wasted cache bandwidth.

16. The computer system of claim 14 wherein the acts further comprise:
  associating the selected portion of source code with a memory issue of the plurality of memory issues; and
  associating the memory issue and the selected portion of source code with the memory address.

17. The computer system of claim 16, wherein the acts further comprise indicating the memory issue associated with the memory address through use of color coding.

18. The computer system of claim 14, wherein the acts further comprise ranking the plurality of memory issues according to importance and/or cost.

* * * * *